Patented Dec. 4, 1928.

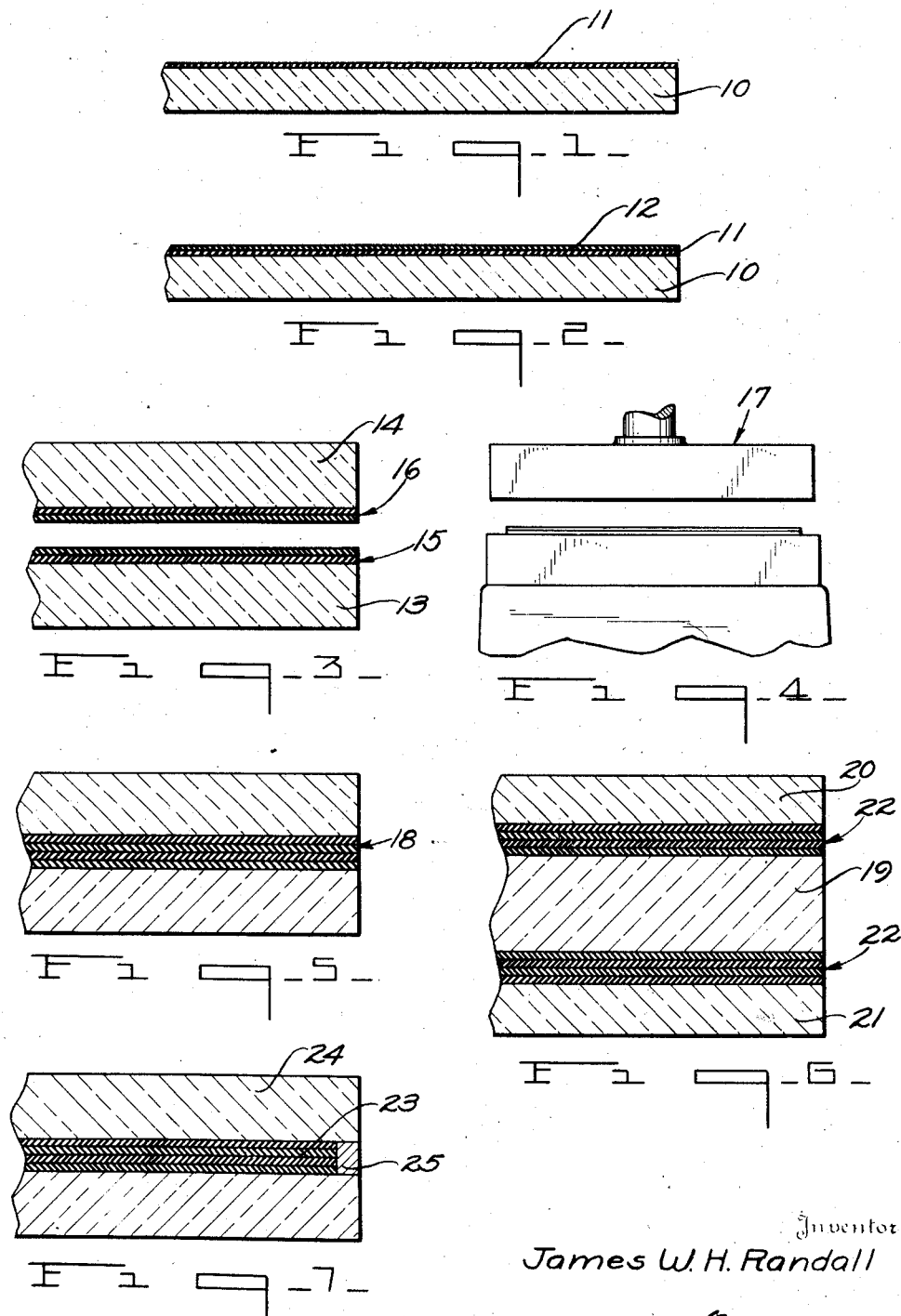

1,693,729

UNITED STATES PATENT OFFICE.

JAMES W. H. RANDALL, OF NEW YORK, N. Y., ASSIGNOR TO THE LIBBEY-OWENS SHEET GLASS COMPANY, OF TOLEDO, OHIO, A CORPORATION OF OHIO.

LAMINATED GLASS AND PROCESS OF PRODUCING THE SAME.

Application filed November 17, 1927. Serial No. 233,829.

The present invention relates to laminated glass and to the process of producing the same.

An important object of the invention is to produce a sheet of laminated glass including a film or sheet of transparent rubber or rubber composition material.

Another object of the invention is to produce a sheet of laminated glass including a lamination formed from uncured rubber.

A further object of the invention is to provide a sheet of laminated glass and process of producing the same wherein preferably resin free, bleached, pale crepe rubber is dissolved in a suitable solvent such as benzol, etc., to form a solution, the solution being applied to one side each of two sheets of glass to form a skin or film thereon, this operation being repeated until the desired amount or deposit of rubber has been placed on the sheets of glass, each film or skin being preferably dried before the succeeding film is applied and then the sheets of glass are arranged so that the rubber deposit of each sheet will contact with the other and then united.

A further object of the invention is to provide a process for producing a sheet of laminated glass wherein a transparent, preferably colorless rubber composition is united to one side each of two sheets of glass, after which the sheets are superimposed in proper relationship and pressed together to obtain a good bond between the contacting rubber surfaces.

Other objects and advantages of the invention will become more apparent during the course of the following description when taken in connection with the accompanying drawings.

In the drawings wherein like numerals are employed to designate like parts throughout the same, Fig. 1 is a diagrammatic sectional view illustrating a single skin or film of rubber composition material on a sheet of glass, Fig. 2 is a similar sectional view illustrating a plurality of skins on a sheet of glass, Fig. 3 is a fragmentary sectional view illustrating two sheets of glass suitably coated or covered with rubber material before they are united, Fig. 4 is a diagrammatic representation of a form of press which may be used to obtain a bond between the laminations, Fig. 5 represents diagrammatically and in section, one form of finished product, Fig. 6 is a similar view of a sheet of "bullet-proof" glass, and Fig. 7 is a section similar to that of Fig. 5 illustrating the use of luting.

The present invention relates to a new article of manufacture, namely, a sheet of laminated glass and to the process of producing it. In accordance with this invention a sheet of glass 10, shown in Fig. 1, whose surfaces may be ground and polished, or not, as desired, is coated on one side with a skin or film 11. The film 11 and corresponding films in the remaining views have been sectioned to illustrate a rubber material, but it is to be understood that the rubber material used is transparent and preferably colorless. The composition used is preferably a solution of resin free, bleached, crepe rubber dissolved in a suitable solvent such as benzol, or sweet gasoline. The pale crepe rubber is preferably freed from the contaminating resins, then bleached and dried before it is dissolved in a suitable solvent. This treatment also destroys certain oxidizing enzymes present in the crepe rubber, which, if allowed to remain, tend to color the rubber in time. The viscosity of the solution may be controlled as desired by the amount of solvent used and also by the addition of other liquids such as solvents and/or plasticizers, if desired. The resultant solution may then be sprayed, painted, or otherwise coated or applied to the sheet of glass 10. Another way of creating the deposit 11 on the sheet of glass is to bind two sheets of glass together face to face and dip the two sheets simultaneously into a bath of rubber composition solution. The sheets may then be removed and held preferably in a vertical position so that excess solution may drain or drip from said sheets. The two sheets, while in the same relation to each other, may again be dipped in the solution and this operation repeated until the desired thickness of film 11 is created. It is preferred that each film be allowed to dry or partially dry before the next application of material. After each sheet has been prepared with the desired thickness of rubber material they may be separated, and due to the fact that the sheets have been tied together, it will be understood that only one surface of each sheet of glass will be coated with the rubber material.

In Fig. 2, the sheet of glass 10 is illustrated as being coated with a film or deposit 11 and a second film 12. As above pointed out, any number of films may be formed on a single sheet of glass.

In Fig. 3, two sheets of glass 13 and 14, having the films designated in their entireties by the numerals 15 and 16, are in condition to be united, and this may be accomplished by means of the press 17. Although the application of heat at the time of pressing is not absolutely necessary, a slight amount of heat is found to be beneficial in getting the desired bond between the laminations. Of course the amount of heat used can be varied, as desired. However, any suitable solvent such as benzol or the like may be used to assist in obtaining the desired bond between the contacting surfaces of the rubber films, although the addition of such a solvent is not necessary for the successful operation of the process. Fig. 5 represents the laminations illustrated in Fig. 3 after they have been united, and it will be seen that the films 15 and 16 create a non-brittle membrane 18 in the finished product. In Fig. 6 is shown a section of a sheet of "bullet-proof" glass which is distinguishable by reason of the center sheet of glass 19, outer sheets 20 and 21, and the two non-brittle membranes 22.

The finished product made from the rubber composition material will be transparent and practically colorless except for the natural color of the glass. It is preferred that the rubber membrane or non-brittle portion of the laminated sandwich be formed from an uncured rubber such as above outlined, or stated differently, the rubber is not vulcanized. Further, the extent to which the rubber composition is dried before the laminations are united can be varied as desired.

In Fig. 7 the inner lamination 23 is shown being of smaller dimensions than the outer laminations 24, to permit the use of luting material 25 designed to prevent the attack of the bond between the laminations when the finished sheet is in actual use. The luting 25 may be a rubber composition material, pitch, or the like, and its use is not absolutely necessary, although in some instances it may be desirable. Obviously, the rubber lamination does not necessarily have to be formed from pale crepe rubber as any rubber that will give a transparent and preferably colorless film may be used. Further, a sheet of laminated glass may be formed by forming a rubber film or skin on one side each of two sheets of glass and then interposing a sheet of cellulose material therebetween and uniting the same.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass including a film of rubber.

2. As a new article of manufacture, a sheet of laminated glass including a lamination formed from rubber.

3. As a new article of manufacture, a sheet of laminated glass including a film of transparent rubber.

4. As a new article of manufacture, a sheet of laminated glass including a film of transparent, substantially colorless rubber.

5. As a new artcle of manufacture, a sheet of laminated glass including a lamination formed from transparent rubber.

6. As a new article of manufacture, a sheet of laminated glass including a film of uncured rubber.

7. As a new article of manufacture, a sheet of laminated glass including a film of transparent, uncured rubber.

8. As a new article of manufacture, a sheet of laminated glass including a film of transparent, substantially colorless uncured rubber.

9. As a new article of manufacture, a sheet of laminated glass including a lamination formed from transparent, uncured rubber.

10. As a new article of manufacture, a sheet of laminated glass including a lamination formed from a solution of rubber and a rubber solvent.

11. As a new article of manufacture, a sheet of laminated glass including a lamination formed from a solution of uncured rubber and a rubber solvent.

12. The process of producing laminated glass, consisting in forming a rubber deposit on one side each of two sheets of glass, and then placing the rubber coated surfaces of the two sheets together, and uniting the same.

13. The process of producing laminated glass, consisting in applying a rubber solution to one side each of two sheets of glass, allowing the films thus formed to dry, and then placing the two films in contact with each other and uniting the same.

14. The process of producing laminated glass, consisting in applying a rubber solution to one side each of two sheets of glass, allowing the films thus formed to dry, and then placing the two films in contact with each other, and uniting the same by pressure without the application of heat.

15. The process of producing laminated glass, consisting in applying a rubber solution to one side each of two sheets of glass, allowing the films thus formed to dry, and then placing the two films in contact with each other, and uniting the same by the application of heat and pressure.

Signed at New York, in the county of New York and State of New York, this 5th day of November 1927.

JAMES W. H. RANDALL.